US008877381B2

(12) United States Patent
Yasuda et al.

(10) Patent No.: US 8,877,381 B2
(45) Date of Patent: Nov. 4, 2014

(54) PRODUCTION PROCESS FOR COMPOSITE OXIDE, POSITIVE-ELECTRODE ACTIVE MATERIAL FOR LITHIUM-ION SECONDARY BATTERY AND LITHIUM-ION SECONDARY BATTERY (75) Inventors: Naoto Yasuda, Kariya (JP); Hitotoshi Murase, Kariya (JP); Ryota Isomura, Kariya (JP)

(73) Assignee: Kabushiki Kaisha Toyota Jidoshokki, Aichi (JP)

( * ) Notice: Subject to any disclaimer, the term of this patent is extended or adjusted under 35 U.S.C. 154(b) by 7 days.

(21) Appl. No.: 13/580,613

(22) PCT Filed: Mar. 7, 2011

(86) PCT No.: PCT/JP2011/001324
§ 371 (c)(1),
(2), (4) Date: Aug. 22, 2012

(87) PCT Pub. No.: WO2011/111364
PCT Pub. Date: Sep. 15, 2011

(65) Prior Publication Data
US 2012/0315544 A1 Dec. 13, 2012

(30) Foreign Application Priority Data

Mar. 9, 2010 (JP) ................................. 2010-051676

(51) Int. Cl.
*H01M 4/13* (2010.01)
*H01M 4/50* (2010.01)
(Continued)

(52) U.S. Cl.
CPC .............. *H01M 4/505* (2013.01); *Y02E 60/122* (2013.01); *C01P 2004/62* (2013.01);
(Continued)

(58) Field of Classification Search
CPC ......... H01M 4/505; H01M 4/13; H01M 4/50; C01G 53/00; C01G 45/02; C01G 45/12; Y02E 60/122; C01P 2006/40; B82Y 30/00
USPC ......... 429/224; 423/599; 252/182.1; 977/773
See application file for complete search history.

(56) References Cited

U.S. PATENT DOCUMENTS

2006/0051671 A1   3/2006   Thackeray et al.
2006/0051673 A1   3/2006   Johnson et al.
(Continued)

FOREIGN PATENT DOCUMENTS

CN        1493522 A      5/2004
JP    2000-149942 A      5/2000
(Continued)

OTHER PUBLICATIONS

Shao-Horn, Y., et al., Structural Characterization of Layered LiMnO2 Electrodes by Electron Diffraction and Lattice Imaging, Journal of the Electrochemical Society, Jul. 1999, pp. 2404-2412, vol. 146, No. 7.*

(Continued)

*Primary Examiner* — Patrick Ryan
*Assistant Examiner* — Kiran Quraishi
(74) *Attorney, Agent, or Firm* — Sughrue Mion, PLLC (57) ABSTRACT A composite oxide is produced via the following: a raw-material mixture preparation step of preparing a raw-material mixture by mixing a metallic-compound raw material and a molten-salt raw material with each other, the metallic-compound raw material at least including one or more kinds of Mn-containing metallic compounds being selected from the group consisting of oxides, hydroxides and metallic salts that include one or more kinds of metallic elements in which Mn is essential, the molten-salt raw material including lithium hydroxide and lithium nitrate, and exhibiting a proportion of the lithium hydroxide with respect to the lithium nitrate (i.e., (Lithium Hydroxide)/(Lithium Nitrate)) that falls in a range of from 0.05 or more to less than 1 by molar ratio; a molten reaction step of reacting said raw-material mixture at from 300° C. or more to 550° C. or less by melting it: and a recovery step of recovering said composite oxide being generated from said raw-material mixture that has undergone the reaction.

11 Claims, 2 Drawing Sheets (51) Int. Cl.
*H01M 4/505* (2010.01)
*C01G 45/12* (2006.01)
*B82Y 30/00* (2011.01)

(52) U.S. Cl.
CPC ........ *C01P 2004/64* (2013.01); *C01P 2002/72* (2013.01); *B82Y 30/00* (2013.01); *C01G 45/1257* (2013.01); *Y10S 977/773* (2013.01)
USPC ............................ 429/224; 423/599; 977/773

(56) References Cited

U.S. PATENT DOCUMENTS

| | | |
|---|---|---|
| 2007/0135128 A1 | 6/2007 | Villa et al. |
| 2007/0148546 A1 | 6/2007 | Shimizu et al. |
| 2009/0123842 A1 | 5/2009 | Thackeray et al. |
| 2010/0143784 A1 | 6/2010 | Johnson et al. |

FOREIGN PATENT DOCUMENTS

| | | | | |
|---|---|---|---|---|
| JP | 2002-025626 A | | 1/2002 | |
| JP | 2003-048718 | * | 2/2003 | ............. C01G 53/00 |
| JP | 2003048718 A | * | 2/2003 | ............. C01G 53/00 |
| JP | 2004-259511 A | | 9/2004 | |
| JP | 2007-200865 A | | 8/2007 | |
| JP | 2008-511960 A | | 4/2008 | |
| JP | 2008-105912 A | | 5/2008 | |
| JP | 2008-270201 A | | 11/2008 | |
| JP | 2011-054516 A | | 3/2011 | |
| WO | 2006/028476 A2 | | 3/2006 | |

OTHER PUBLICATIONS

English Translation of JP 2003048718 A.*
Shao-Horn, Y., et al., Structural Characterization of Layered $LiMnO_2$ Electrodes by Electron Diffraction and Lattice Imaging, Journal of the Electrochemical Society, Jul. 1999, pp. 2404-2412, vol. 146, No. 7.
Thackeray, Michael, et al., "$Li_2MnO_3$-stabilized $LiMnO_2$ (M=Mn, Ni, Co) electrodes for lithium-ion batteries," Journal of Materials Chemistry, Aug. 14, 2007, pp. 3053-3272, vol. 17, No. 30.
Chinese Office Action received Jan. 22, 2014 in corresponding Chinese Application No. 201180012933.7.
Office Action for corresponding Japanese Patent Application No. 2012-504320 received Aug. 20, 2013.

* cited by examiner

PRODUCTION PROCESS FOR COMPOSITE OXIDE, POSITIVE-ELECTRODE ACTIVE MATERIAL FOR LITHIUM-ION SECONDARY BATTERY AND LITHIUM-ION SECONDARY BATTERY

CROSS REFERENCE TO RELATED APPLICATIONS

This application is a National Stage of International Application No. PCT/JP2011/001324 filed on Mar. 7, 2011, which claims priority from Japanese Patent Application No. 2010-051676, filed on Mar. 9, 2010, the contents of all of which are incorporated herein by reference in their entirety.

TECHNICAL FIELD

The present invention is one which relates to a composite oxide that is employed as a positive-electrode material for lithium-ion secondary battery, and to a lithium-ion secondary battery that uses that composite oxide.

BACKGROUND ART

Recently, as being accompanied by the developments of portable electronic devices such as cellular phones and notebook-size personal computers, or as being accompanied by electric automobiles being put into practical use, and the like, small-sized, lightweight and high-capacity secondary batteries have been required. At present, as for high-capacity secondary batteries meeting these demands, non-aqueous secondary batteries have been commercialized, non-aqueous secondary batteries in which lithium cobaltate (e.g., $LiCoO_2$) and the carbon-system materials are used as the positive-electrode material and negative-electrode material, respectively. Since such a non-aqueous secondary battery exhibits a high energy density, and since it is possible to intend to make it downsize and lightweight, its employment as a power source has been attracting attention in a wide variety of fields. However, since $LiCoO_2$ is produced with use of Co, one of rare metals, as the raw material, it has been expected that its scarcity as the resource would grow worse from now on. In addition, since Co is expensive, and since its price fluctuates greatly, it has been desired to develop positive-electrode materials that are inexpensive as well as whose supply is stable.

Hence, it has been regarded promising to employ lithium-manganese-oxide-system composite oxides whose constituent elements are inexpensive in terms of the prices as well as which include stably-supplied manganese (Mn) in their essential compositions. Among them, a substance, namely, $Li_2MnO_3$ that includes tetravalent manganese ions alone but does not include any trivalent manganese ions making a cause of the manganese elution upon charging and discharging, has been attracting attention. Although it has been believed so far that it is impossible to charge and discharge $Li_2MnO_3$, it has come to find out that it is possible to charge and discharge it by means of charging it up to 4.8 V, according to recent studies. However, it is needed to further improve $Li_2MnO_3$ with regard to the charging/discharging characteristics.

In order to improve the charging/discharging characteristics, it has been done actively to develop $xLi_2MnO_3 \cdot (1-x)LiMeO_2$ (where $0<\text{"}x\text{"}\leq 1$), one of solid solutions between $Li_2MnO_3$ and $LiMeO_2$ (where "Me" is a transition metal element). Note that it is feasible to write and express $Li_2MnO_3$ by a general formula, $Li(Li_{0.33}Mn_{0.67})O_2$, as well, and that it is said to belong to the same crystal structure (i.e., a layered rock-salt structure) as that of $LiMO_2$. Consequently, there arises a case where $xLi_2MnO_3 \cdot (1-x)LiMeO_2$ is set forth as $Li_{1.33-y}Mn_{0.67-z}Me_{y+z}O_2$ (where $0<\text{"}y\text{"}<0.33$, and $0<\text{"}z\text{"}<0.67$), too, but even any of the two methods for writing it down specify a composite oxide that possesses the same sort of crystal structure.

For example, Patent Literature No. 1 discloses a production process for solid solution between $LiMO_2$ and $Li_2NO_3$ (where "M" is one or more kinds that are selected from Mn, Ni, Co and Fe, and "N" is one or more kinds that are selected from Mn, Zr and Ti). This solid solution is obtainable as follows: ammonia water is dropped to a mixed solution, in which salts of respective metallic elements that correspond to "M" and "N" are dissolved, until the pH becomes 7; an $Na_2CO_3$ solution is further dropped to it in order to deposit "M"-"N"-system composite carbonates; and the resulting "M"-"N"-system composite carbonates are calcined after mixing them with $LiOH \cdot H_2O$.

However, upon employing a secondary battery including $Li_2MnO_3$ as the positive-electrode active material, it is needed to activate the positive-electrode active material at the time of the first-time charging. Since the activation is accompanied by a large irreversible capacity, ions having moved to the counter electrode do not come back, and so there is such a problem that charging/discharging balance between the positive electrode and the negative electrode becomes imbalanced. With regard to the mechanism of this activation and to an obtainable capacity by means of the activation, it is the present situation that they have not been clearly clarified yet (see Non-patent Literature No. 1).

Moreover, in a case where a particle diameter of $Li_2MnO_3$ is large, since only the particles' superficial layer is activated, it is believed that it is necessary to make the particle diameter of $Li_2MnO_3$ smaller in order to turn $Li_2MnO_3$ to be employed into an active material serving as battery in the total amount virtually. In other words, it is needed to develop convenient processes for synthesizing fine particles as well. For example, in Patent Literature No. 2, a process for synthesizing nano-order oxide particles is disclosed. In Example No. 3 of Patent Literature No. 2, $MnO_2$ and $Li_2O_2$ are added to and are then mixed with a mixture, in which $LiOH \cdot H_2O$ and $LiNO_3$ are mixed in a molar ratio of 1:1; and they are turned into 300° C. molten salt after letting the mixture go through a drying step, thereby synthesizing lithium manganate (e.g., $LiMn_2O_4$) with a spinel structure, whose manganese has an average oxidation number that is equal to a valence number of 3.5.

RELATED TECHNICAL LITERATURE

Patent Literature

Patent Literature No. 1: Japanese Unexamined Patent Publication (KOKAI) Gazette No. 2008-270,201; and
Patent Literature No. 2: Japanese Unexamined Patent Publication (KOKAI) Gazette No. 2008-105,912

Non-Patent Literature

Non-patent Literature No. 1: Michael M. Thackeray, et al., "$Li_2MnO_3$-stablized $LiMO_2$ (M=Mn, Ni, Co) Electrodes for Lithium-ion Batteries," Journal of Materials Chemistry 17, (2007), pp. 3,112-3,125

SUMMARY OF THE INVENTION

Assignment to be Solved by the Invention

As described above, although a fine-particle-shaped lithium-manganese-oxide-system composite oxide including tetravalent Mn has been sought for, it is assumed that a particle diameter of a solid solution between $LiMO_2$ and $Li_2NO_3$ that is obtainable by the process according to Patent Literature No. 1 would be from several micrometers to several dozen micrometers from the calcining temperature and X-ray diffraction pattern shown in FIG. 6. That is, it is not possible to obtain nano-order fine particles by the process being set forth in Patent Literature No. 1.

Moreover, in accordance with the production process according to Patent Literature No. 2, although it is possible to produce fine particles of $LiMn_2O_4$ in nanometer order, it has not been possible to make a composite oxide including $Li_2MnO_3$ along with $LiMn_2O_4$.

In view of the aforementioned problematic issues, the present invention aims at providing a novel production process for fine-particle-shaped lithium-manganese-oxide-system composite oxide including a composite oxide that has a layered rock-salt structure in which $Li_2MnO_3$ makes the essential composition, and being capable of compensating the irreversible capacity of this $Li_2MnO_3$. Moreover, it aims at providing a positive-electrode active material including a composite oxide that is obtainable by means of this novel production process, and a lithium-ion secondary battery using the same.

Means for Solving the Assignment

The present inventors found out that it is possible to compensate for the irreversible capacity of $Li_2MnO_3$ by using a lithium manganate oxide, which possesses a spinel structure, along with $Li_2MnO_3$, which possesses a layered rock-salt structure. For example, it is feasible for $LiMn_2O_4$ possessing a spinel structure to occlude lithium ions until it turns into $Li_2Mn_2O_4$. $Li_2MnO_3$ cannot occlude lithium ions that have been pulled off at the first-time charging. However, it was understood that high-capacity lithium-ion secondary batteries are obtainable by employing $Li_2MnO_3$ with a layered rock-salt structure, together with a lithium manganate oxide with a spinel structure, like $LiMn_2O_4$, that is capable of further occluding lithium ions, as a positive-electrode active material. And, in the present invention, they succeeded in obtaining composite oxides, which included not only an $LiMnO_3$ phase with a layered rock-salt structure but also a lithium-manganate oxide phase with a spinel structure, in a shape of fine particulate shape.

Specifically, a production process for composite oxide according to the present invention is characterized in that:

it is a production process for composite oxide comprising a dual crystal structure of layered rock-salt structure and spinel structure, and the composite oxide at least including lithium (Li) element and manganese (Mn) element;

said composite oxide is obtained via the following:

a raw-material mixture preparation step of preparing a raw-material mixture by mixing a metallic-compound raw material and a molten-salt raw material with each other, the metallic-compound raw material at least including one or more kinds of Mn-containing metallic compounds being selected from the group consisting of oxides, hydroxides and metallic salts that include one or more kinds of metallic elements in which Mn is essential, the molten-salt raw material including lithium hydroxide and lithium nitrate, and exhibiting a proportion of the lithium hydroxide with respect to the lithium nitrate (i.e., (Lithium Hydroxide)/(Lithium Nitrate)) that falls in a range of from 0.05 or more to less than 1 by molar ratio;

a molten reaction step of reacting said raw-material mixture at from 300° C. or more to 550° C. or less by melting it: and a recovery step of recovering said composite oxide being generated from said raw-material mixture that has undergone the reaction.

In the production process for composite oxide according to the present invention, at least the following are used as the raw materials: a "metallic-compound raw material" including one or more kinds of Mn-containing metallic compounds that are selected from the group consisting of oxides, hydroxides and metallic salts which include one or more kinds of metallic elements in which Mn is essential; and a "molten-salt raw material" that includes lithium hydroxide and lithium nitrate. On this occasion, the following can be presumed as reasons why composite oxides comprising dual crystal structures of layered rock-salt structure and spinel structure are obtainable by mixing the lithium hydroxide/lithium nitrate in the above-mentioned predetermined proportion, as well as by reacting the ingredients at the above-mentioned predetermined temperatures.

It is believed that the compositions of obtainable composite oxides are subject to the properties of molten salt (e.g., acidity/basicity) and the reaction temperatures. For example, in the synthesis of a composite oxide including Mn, the Mn is likely to become tetravalent in a case where it is under such a highly oxidizing condition that the reaction activity is high, and so composite oxides with layered rock-salt structures tend to be synthesized as a whole. In the production process according to the present invention, the properties of molten salt are adjusted optimally by using lithium hydroxide and lithium nitrate combinedly as a raw-material mixture including Li, and hence composite oxides, which include not only a layered rock-salt structure but also a spinel structure, are obtainable. When the proportion, namely, (Lithium Hydroxide)/(Lithium Nitrate), is from 0.05 or more to less than 1 by molar ratio, and at the same time when the reaction temperature is 550° C. or less, appropriate oxidizing conditions and reaction activities are obtainable, and so it is predicted to be possible to synthesize composite oxides comprising dual crystal structures of layered rock-salt structure and spinel structure with ease.

In addition, fine-particle-shaped composite oxides are obtainable by means of turning the raw-material mixture into molten salt and then reacting the raw materials in the resulting molten salt. This is because the reactions of the raw materials, which are mixed uniformly in ionic states within the molten salt, proceed at low temperatures and for a short period of time.

Moreover, it is also allowable to carry out a precursor synthesis step, in which an aqueous solution including at least two kinds of metallic elements is alkalified in order to obtain precipitates, before the raw-material mixture preparation step in the production process for composite oxide according to the present invention, and then to employ the resulting precipitates as apart of or the whole of the metallic-compound raw material at the mixture preparation step. Composite oxides, which include, together with Li, one or more kinds of metals and Mn, are obtainable in high purity by using the precipitates as the precursors.

Composite oxides, which are obtainable by means of the production process for composite oxide according to the present invention, can be employed as a positive-electrode active material for lithium-ion secondary battery. That is, it is also possible to grasp the present invention as a positive-electrode active material for lithium-ion secondary battery that is characterized in including a composite oxide that is obtained by means of the production process for composite oxide according to the present invention.

Moreover, if a positive-electrode active material for lithium-ion secondary battery according to the present invention should be defined, it includes: a phase of layered rock-salt structure that is expressed by a compositional formula: $Li_2M^1O_3$ (where "$M^1$" is one or more kinds of metallic elements in which Mn is essential; and Li may even be substituted by hydrogen in apart thereof); and another phase of spinel structure; and it further includes single-crystalline primary particles whose c-axis-direction particle diameters being calculated by means of the Scherrer equation are 100 nm or less. Note that it is needless to say that composite oxides, whose compositions have deviated slightly from the aforementioned compositional formula due to the deficiency, or the like, in Li, $M^1$ or O that occurs inevitably, are also included herein.

Effect of the Invention

In accordance with the present invention, lithium-manganese-oxide-system composite oxides, which comprise dual crystal structures of layered rock-salt structure and spinel structure, are obtainable in a fine particulate shape, respectively.

MODES FOR CARRYING OUT THE INVENTION

Hereinafter, explanations will be made on some of the modes for performing the production process for composite oxide, positive-electrode active material for lithium-ion secondary battery and lithium-ion secondary battery according to the present invention. Note that, unless otherwise specified, ranges of numeric values, namely, "from 'a' to 'b'" being set forth in the present description, involve the lower limit, "a," and the upper limit, "b," in those ranges. And, the other ranges of numeric values are composable by arbitrarily combining not only any two of these upper-limit values and lower-limit values but also any two of those involving the numeric values that are listed in specific examples.

Composite Oxide

Hereinafter, the respective steps of a production process for composite oxide according to the present invention will be explained. The production process for composite oxide according to the present invention is a production process for composite oxide that comprises a dual crystal structure of layered rock-salt structure and spinel structure, and which at least includes a lithium (Li) element and a manganese (Mn) element; the production process mainly includes a raw-material mixture preparation step, a molten reaction step, and a recovery step; and it can further include a precursor synthesis step and/or heat-calcination treatment step, and so on, if needed.

First of all, a metallic-compound raw material and a molten-salt raw material are prepared. The raw-material mixture preparation step is a step in which at least a metallic-compound raw material and a molten-salt raw material are mixed with each other in order to prepare a raw-material mixture. The metallic-compound raw material at least includes one or more kinds of Mn-containing metallic compounds that are selected from the group consisting of oxides, hydroxides and metallic salts which include one or more kinds of metallic elements in which Mn is essential.

As for a raw material for supplying Mn, the following are used: one or more kinds of Mn-containing metallic compounds, which are selected from the group consisting of oxides, hydroxides and metallic salts which include one or more metallic elements, preferably, transition metal elements, in which Mn is essential. One of the Mn-containing metallic compounds is essential for the metallic-compound raw material. To be concrete, the following can be given: manganese dioxide ($MnO_2$); dimanganese trioxide ($Mn_2O_3$); manganese monoxide (MnO); trimanganese tetraoxide ($Mn_3O_4$); manganese hydroxide ($Mn(OH)_2$); manganese oxyhydroxide (MnOOH); manganese acetate ($Mn(CHCOO)_2 \cdot 4H_2O$); manganese nitrate ($Mn(NO_3)_2 \cdot 6H_2O$); manganese carbonate ($MnCO_3$); manganese chloride ($MnCl_2$); or Mn-containing metallic compounds in which a part of Mn in these oxides, hydroxides or metallic salts is substituted by Cr, Fe, Co, Ni, Al or Mg, and the like; and so forth. It is allowable to use one kinds or two or more kinds of these as an Mn-containing metallic compound, respectively. Among them, $MnO_2$ is preferable because not only it can be procured easily but also those with comparatively high purities are likely to be procured.

Here, it is also allowable that the metallic compounds can include tetravalent Mn alone. This is due to the fact that it becomes feasible for divalent or tetravalent Mn to exist because reactions proceed within molten salt whose oxidizing condition is adjusted moderately. Moreover, the metallic compounds do not necessarily need to include tetravalent Mn, but it is even permissible that it can include Mn with a valence number of less than 4 alone. This is due to the fact that, even when being divalent or trivalent Mn, at least a part thereof turns into being tetravalent because reactions proceed under highly oxidizing conditions within molten salt. This holds true similarly for the metallic elements that substitute for Mn, too.

In accordance with the production process according to the present invention, it is also possible to produce composite oxides in which Mn is substituted by the other metallic elements. That is, it is also possible to produce composite oxides that include, in addition to Li and Mn, another metallic element. It is allowable to use metallic compounds in which a part of Mn in the above-mentioned Mn-containing metallic compounds has been substituted; alternatively, it is permissible to further employ one or more kinds of second metallic compounds that are selected from the group consisting of oxides, hydroxides and metallic salts that include one or more kinds of metallic elements other than Mn, especially, transition metal elements other than Mn, in addition to the Mn-containing metallic compounds. As for specific examples of the second metallic compounds, the following can be given: cobalt monoxide (CoO); cobalt nitrate ($Co(NO_3)_2 \cdot 6H_2O$); cobalt hydroxide (Co $(OH)_2$); nickel nitrate (Ni $(NO_3)_2 \cdot 6H_2O$); nickel sulfate ($NiSO_4 \cdot 6H_2O$); aluminum hydroxide ($Al(OH)_3$); aluminum nitrate (Al $(NO_3)_3 \cdot 9H_2O$); copper oxide (CuO); copper nitrate (Cu $(NO_3)_2 \cdot 3H_2O$); calcium hydroxide ($Ca(OH)_2$), and the like. It is allowable to use one kind or two or more kinds of these as the second metallic compounds.

Elements substituting for Mn can preferably be one or more kinds that are selected from transition metals. Note that improvements in battery characteristics can be intended by adding one or more kinds, which are selected from the group consisting of earth metals (i.e., aluminum, gallium, indium and thallium) and alkaline-earth metals (i.e., calcium, strontium, barium and radium), in a trace amount (e.g., less than 10% by mass when the resulting composite oxides are taken as 100% by mass).

Moreover, it is allowable to preliminarily synthesize in advance one or more kinds of metallic compounds (in other words, Mn-containing metallic compounds and/or second metallic compounds), which are selected from the group consisting of oxides, hydroxides and metallic salts that include two or more kinds of metallic elements that can possibly include also Mn, as a precursor. That is, before the raw-material mixture preparation step, it is permissible to carry out a precursor synthesis step in which an aqueous solution at least including two kinds of metallic elements is alkalified in order to obtain precipitates. As for an aqueous solution, water-soluble inorganic salts, specifically, nitrates, sulfates or chlorides of the metals, and the like, are dissolved in water. When the resulting aqueous solution is alkalified with alkali metal hydroxide or ammonia water, and so forth, precursors can be generated as precipitates.

Moreover, as raw materials for supplying Li, lithium hydroxide and lithium nitrate are used. Lithium nitrate is adopted because it is a lithium salt with low melting point and it is unlikely to make impurities remain in composite oxides to be produced. Lithium hydroxide is employed in order for adjusting the oxidizing power of the resulting molten salt because the basicity is the highest among lithium salts. Note that, as the lithium hydroxide, it is even allowable to use its anhydrides as well as to use its hydrates. That is, as for an employable lithium hydroxide, LiOH (i.e., anhydride), $LiOH \cdot H_2O$ (i.e., hydrate), and the like, can be given.

At the raw-material mixture preparation step, lithium hydroxide and lithium nitrate are mixed with each other so as to make a proportion of lithium hydroxide with respect to lithium nitrate (i.e., (Lithium Hydroxide)/(Lithium Nitrate)) 0.05 or more to less than 1 by molar ratio, thereby preparing a molten-salt raw material. When the mixing ratio is less than 0.05, it is difficult to produce composite oxides that possess desired structures because the oxidizing power of the resulting molten salt is insufficient. That is, although the greater the content of lithium hydroxide is set the more likely it is to obtain desired composite oxides, as such is not desirable because compound phases possessing spinel structure become less likely to be generated when the mixing ratio is 1 or more. As for a mixing proportion, it is desirable that it can be 0.08 or more, 0.1 or more, furthermore 0.2 or more, by a molar ratio of (Lithium Hydroxide)/(Lithium Nitrate); and it is desirable that it can be 0.9 or less, 0.8 or less, furthermore 0.7 or less.

As described above, the molten-salt raw material brings about desirable oxidizing conditions for generating desired composite oxides due to the setup that lithium hydroxide and lithium nitrate fall in the above-mentioned mixing proportion. Consequently, it is needless to say that it is desirable to keep away from employing other compounds that affect the oxidizing condition of the resulting molten salt. For example, lithium peroxide ($Li_2O_2$) is not desirable since it is unstable in air and is a strong oxidizing agent so that it has greatly changed the oxidizing conditions that are to be adjusted by means of the mixing proportions between lithium hydroxide and lithium nitrate.

Moreover, it is also feasible to change the particle diameters of obtainable composite oxides by changing a mixing proportion in the molten-salt raw material. For example, in molten-salt reactions at identical temperatures, the larger the molar ratio of (Lithium Hydroxide)/(Lithium Nitrate) becomes the more feasible it is to make the particle diameters of particles to be synthesized smaller. Moreover, the higher an oxygen concentration is set in the molten reaction step the more possible it is to make the particle diameters of particles to be synthesized smaller.

Moreover, it is allowable that a blending proportion of the above-mentioned metallic-compound raw material and molten-salt raw material can suitably be selected in compliance with proportions of Li and Mn that are included in composite oxides to be produced, as well as those of the other metals, if needed. When defining it daringly, it is permissible to set a proportion of metal being included in the metallic-compound raw material with respect to lithium metal being included in the molten-salt raw material (i.e., (Metal in Metallic-compound Raw Material)/(Lithium Metal in Molten-salt Raw Material)) at from 0.01 or more to 0.2 or less by molar ratio. Since the amounts of generating composite oxides become less with respect to the employed amounts of the molten-salt raw material when it is less than 0.01, as such is not desirable in the aspect of production efficiency. Moreover, since the amount of molten salt for dispersing the metallic-compound raw material has run short and so the resulting composite oxides might possibly agglomerate or undergo granular growths within the molten salt when it exceeds 0.2, as such is not desirable. A further desirable proportion of the (Metal in Metallic-compound Raw Material)/(Lithium Metal in Molten-salt Raw Material) can be from 0.015 to 0.1, or from 0.02 to 0.07, furthermore from 0.03 to 0.05, by molar ratio.

Moreover, it is also feasible to define the above-mentioned blending proportion of the molten-salt raw material by the theoretical compositions of lithium being included in targeted composite oxides with respect to lithium being included in the molten-salt raw material (i.e., (Li in Composite Oxide)/ (Li in Molten-salt Raw Material)). The molten-salt raw material not only accomplishes a role of a supply source for lithium but also accomplishes a role of adjusting the oxidizing condition of molten salt. Consequently, it is desirable that the molten-salt raw material can include lithium in an amount that exceeds the theoretical compositions of lithium being included in composite oxides to be produced. Although it is allowable that the ratio, (Li in Composite Oxide)/(Li in Molten-salt Raw Material), can be less than 1 by molar ratio, it is preferable to be from 0.01 to 0.2, and it is further preferable to be from 0.015 to 0.1, or from 0.02 to 0.07, or from 0.03 to 0.05. Since the amounts of generating composite oxides become less with respect to the employed amounts of the molten-salt raw material when it is less than 0.01, as such is not desirable in the aspect of production efficiency. Moreover, since the amount of molten salt for dispersing the metallic-compound raw material has run short and so the resulting composite oxides might possibly agglomerate or undergo granular growths within the molten salt when it exceeds 0.4, as such is not desirable.

Moreover, it is allowable to carry out a drying step of drying the raw-material mixture after the raw-material mixture preparation step, but before the molten reaction step. When using a vacuum drier for the drying, it is permissible to vacuum dry the raw-material mixture at from 80 to 150° C. for from 2 to 24 hours. Water, which exists within molten salt comprising the molten-salt raw material that includes lithium hydroxide, exhibits a pH that is enhanced very much. When the molten reaction step is carried out in the presence of water with high pH, there might arise such a possibility that the components of crucible are eluted into the resulting molten salt by means of that water coming in contact with the crucible, although, in a trace amount, depending on the types of the crucible. Since the water content in the raw-material mixture is removed at the drying step, this leads to inhibiting crucibles' components from eluting. Note that, in a case where anhydrous lithium hydroxide is employed as the lithium hydroxide, or lithium hydroxide monohydrate is dehydrated in advance to employ, a similar advantageous effect is obtainable even when omitting the drying step. Moreover, it is possible to prevent water from boiling to result in dissipating the resultant molten salt in the molten reaction step by means of removing water from the raw-material mixture in the drying step.

The molten reaction step is a step in which the raw-material mixture is melted to react it. The reaction temperature is a temperature of the raw-material mixture at the molten reaction step; although it can be a melting point or more of the molten-salt raw material, it is difficult to produce composite oxides possessing desired structures because the reaction activity of molten salt is insufficient at less than 300° C. Moreover, when the reaction temperature is 300° C. or more, furthermore 330° C. or more, the crystal structures of obtainable composite oxides stabilize. A preferable lower limit of the reaction temperature can be 340° C. or more, furthermore 345° C. or more. Although an upper limit of the reaction temperature depends on the types of the raw-material mixture, it can be 550° C. or less, or can desirably be 500° C. or less. Note however that, because lithium nitrate decomposes violently when it becomes high temperatures (e.g., about 600° C.), it is possible to carry out the synthesis of composite oxides under relatively stabilized conditions when being 500° C. or less. When employing manganese dioxide as a metallic compound that supplies Mn, it is desirable that the reaction temperature can be from 330° C. to 470° C., furthermore from 350° C. to 450° C. When the raw-material mixture is retained at such a temperature for 30 minutes or more, further desirably for from 1 to 6 hours, the raw-material mixture reacts sufficiently. Moreover, when the molten reaction step is carried out in an oxygen-containing atmosphere, for example, in air or in a gaseous atmosphere including oxygen gas and/or ozone gas, composite oxides comprising a layered rock-salt structure and a spinel structure are likely to be obtained as a major phase. When being an atmosphere containing oxygen gas, it is allowable to set an oxygen-gas concentration at from 20 to 100% by volume, furthermore from 50 to 100% by volume.

Moreover, there are not any limitations on a cooling rate for the raw-material mixture after the molten reaction step especially. When being defined concretely, it is desirable to carry out cooling at a rate of from 0.5 to 5° C./minute, furthermore from 1 to 3° C./minute, until a temperature of the post-molten-reaction-step raw-material mixture becomes a temperature at which molten salt solidifies, namely, 200° C. or less, for instance. Note that, in later-described examples, the cooling rate was set so that molten salt became 200° C. in 2 hours approximately from the beginning of the cooling.

The recovery step is a step of recovering a composite oxide that is generated from the post-reaction raw-material mixture (or molten salt). There are not any limitations on the recovery method especially; however, since composite oxides, which have been generated at the molten reaction step, are insoluble in water, the resulting molten salt is cooled sufficiently to solidify in order to turn them into solids, then the resultant solids are dissolved in water, and thereby the composite oxides are obtainable as insoluble substances. Thus, it is allowable to take out the resulting composite oxides by drying filtered substances that have been obtained by filtering the resultant aqueous solution.

Moreover, after the recovery step, it is also allowable to carry out a proton substitution step in which hydrogen (H) substitutes for a part of Li in the resulting composite oxides. In the proton substitution step, a part of Li in the resultant post-recovery-step composite oxides can be replaced readily by H by means of contacting the composite oxides with a solvent such as a diluted acid.

Moreover, later than the recovery step (or may possibly be even later than the proton substitution step), it is also allowable to carry out a heat-calcination treatment step in which the resulting composite oxides are calcined. By carrying out calcination, residual stresses existing in the composite oxides are removed. Moreover, by carrying out calcination, composite oxides are obtainable, composite oxides from which impurities are removed, impurities that have not been removed completely at the recovery step to turn into films, for instance, so that they reside on the composite oxides' surfaces. It is believed that such impurities would be made up of the following as the major component: one or more kinds of lithium compounds that are selected from the molten-salt raw material (i.e., lithium hydroxide and/or lithium nitrate), or lithium salts such as $Li_2CO_3$, and the like. Consequently, in a case where Li to be included in the composite oxides is less than the theoretical compositions (i.e., Li deficiency), the superficial portions of the resultant composite oxides and the lithium compounds are reacted with each other by means the heat of calcination, thereby reducing the Li deficiency in the composite oxides as well as decomposing the lithium compounds. That is, as a result of calcination, composite oxides are obtainable, composite oxides from which the residual stresses have been removed, and whose superficial impurities and Li deficiency have been reduced. It is desirable that a calcination temperature can be 300° C. or more, furthermore from 350 to 500° C., and it is desirable to retain the resulting composite oxides at such a temperature for 20 minutes or more, furthermore for 0.5 to 2 hours.

It is allowable to carry out the calcination in an oxygen-containing atmosphere. It is permissible to carry out the heat-calcination step in an oxygen-containing atmosphere, for example, in air or in a gaseous atmosphere including oxygen gas and/or ozone gas. When being an atmosphere containing oxygen gas, it is allowable to set an oxygen-gas concentration at from 20 to 100% by volume, furthermore from 50 to 100% by volume. Composite oxides, which have been subjected to such a heat-calcination step, include spinel-structured compounds that include much tetravalent Mn.

A composite oxide, which has been obtained by means of the production process according to the present invention that has been described in detail so far, has characteristics that are different from those of composite oxides that have been produced by the other production processes but possess the same composition as that of the above. Hereinafter, those characteristics will be listed.

The composite oxide comprises a dual crystal structure of layered rock-salt structure and spinel structure. Such a crystal structure can be ascertained by means of X-ray diffraction (or XRD), electron-beam diffraction, and the like.

It is allowable that the composite oxide can include single-crystalline primary particles. It is possible to ascertain that the primary particles are virtually single crystal by means of high-resolution image by TEM. Moreover, it is permissible that the particle diameters of the primary particles in the composite oxide can be 500 nm or less, furthermore from 10 to 200 nm. Although detailed descriptions will be made later on a measurement of the particle diameters, it is feasible to measure them with use of high-resolution image by TEM. It is also possible to define the primary particle diameters from XRD. It is allowable that the composite oxide can include single-crystalline primary particles whose c-axis-direction particle diameters being calculated by means of the Scherrer equation are 100 nm or less. Preferable c-axis-direction particle diameters of the primary particles in the composite oxide can be 50 nm or less, furthermore from 4 to 20 nm, according to the Scherrer equation. Note that a half-value width is taken as a value that is measured at the position of an intensity that is calculated by $I_{max}/2$ when the maximum intensity of (001) in $Li_2MnO_3$, which can be seen in the vicinity of 18.5-degree diffraction angle (2θ, CuKα ray used), is labeled the "$I_{max}$." As described earlier, the smaller the primary particle diameters are the more likely it is that they can be activated; however, their crystal structures become likely to collapse due to charging and discharging so that the resulting battery characteristics might possibly decline when being too small, and accordingly as such is not preferable.

Note that, in the composite oxides being obtainable by means of the production process according to the present invention, compounds with layered rock-salt structure, and compounds with spinel structure are not put in a state in which they are mixed with each other as their independent particles; but a solid solution is formed between the compounds with layered rock-salt structure and compounds with spinel structure in the individual particles. Note that it is feasible to ascertain from TEM images by transmission electron microscope, or from X-ray diffraction patterns, that solid solutions like this are formed.

When the composite oxides are expressed by a compositional formula, the compounds with layered rock-salt structure can be expressed by $Li_2M^1O_3$ (where "$M^1$" is one or more kinds of metallic elements in which Mn is essential; and Li may even be substituted by hydrogen in a part thereof). That is, $Li_2MnO_3$ (where Mn is tetravalent) with α-$NaFeO_2$ type layered rock-salt structure makes the essential composition. Moreover, in the compounds with spinel structure, its Mn can take on a valence number of from 3.5 to 4. Consequently, as for a specific composition, the following can make the essential composition: $LiMn_2O_4$ (where Mn exhibits a valence number of 3.5; and $Li_4Mn_5O_{12}$ (where Mn is tetravalent); alternatively, of these, those in which a part of Mn is substituted by the other metallic elements, and the like. Therefore, it is permitted that an average oxidation number of Mn in the composite oxides that are obtainable by means of the production process according to the present invention can fall in a range of from 3.5 or more by valency and to 4.0 or less by valency, furthermore from 3.7 or more by valency up to 4.0 or less by valency.

Note that it is needless to say that, in the present description, the phrase, "making the essential composition," shall not be limited to those having the stoichiometric compositions, but those having non-stoichiometric compositions with deficiencies in Li, Mn or O that occur inevitably in the production, for instance, and the like. Moreover, it is also allowable that Li can be substituted by H in an amount of 60% or less, furthermore 45% or less, by atomic ratio. Moreover, it is ever permissible that Mn can be substituted by the other elements in an amount of less than 50%, furthermore less than 80%. As for the other metallic elements, it is preferable that, from a viewpoint of chargeable/dischargeable capacity in a case where they are made into electrode materials, they can be selected from the group consisting of Ni, Al, Co, Fe, Mg, and Ti.

Lithium-Ion Secondary Battery

It is possible to use the composite oxides, which have been obtained by means of the production process according to the present invention, as a positive-electrode active material for non-aqueous-system electrolyte secondary battery, especially, for lithium-ion secondary battery, respectively. Hereinafter, explanations will be made on a lithium-ion secondary battery using a positive-electrode active material for lithium-ion secondary battery that includes one of the aforementioned composite oxides. This lithium-ion secondary battery is mainly equipped with a positive electrode, a negative electrode, and a non-aqueous electrolyte. Moreover, in the same manner as common lithium-ion secondary batteries, it is further equipped with a separator, which is held between the positive electrode and the negative electrode.

The positive electrode includes a positive-electrode active material into which lithium ions can be inserted and from which they can be extracted, and a binding agent that binds the positive-electrode active material together. It is also allowable that it can further include a conductive additive. The positive-electrode active material includes one of the above-mentioned composite oxides independently. Alternatively, it is even permissible that the positive-electrode active material can further include one or more kinds of the other positive-electrode active materials being selected from the group consisting of $LiCoO_2$, $LiNi_{1/3}Co_{1/3}Mn_{1/3}O_2$, $LiMn_2O_4$, S, and the like, which have been used for common lithium-ion secondary batteries, along with one of the above-mentioned composite oxides.

Moreover, there are not any limitations especially on the binding agent and conductive additive, and so they can be those which are employable in common lithium-ion secondary batteries. The conductive additive is one for securing the electric conductivity of electrode, and it is possible to use for the conductive additive one kinds of carbon-substance powders, such as carbon blacks, acetylene blacks and graphite, for instance; or those in which two or more kinds of them have been mixed with each other. The binding agent is one which accomplishes a role of fastening and holding up the positive-electrode active material and the conductive additive together, and it is possible to use for the binding agent the following: fluorine-containing resins, such as polyvinylidene fluoride, polytetrafluoroethylene and fluororubbers; or thermoplastic resins, such as polypropylene and polyethylene, and the like, for instance.

The negative electrode to be faced to the positive electrode can be formed by making metallic lithium, namely, a negative-electrode active material, into a sheet shape. Alternatively, it can be formed by press bonding the one, which has been made into a sheet shape, onto a current-collector net, such as nickel or stainless steel. Instead of metallic lithium, it is possible to use lithium alloys or lithium compounds as well. Moreover, in the same manner as the positive electrode, it is also allowable to employ a negative electrode comprising a negative-electrode active material, which can absorb lithium ions and from which they can be desorbed, and a binding agent. As for a negative-electrode active material, it is possible to use the following: natural graphite; artificial graphite; organic-compound calcined bodies, such as phenolic resins; and powders of carbonaceous substances, such as cokes, for instance. As for a binding agent, it is possible to use fluorine-containing resins, thermoplastic resins, and the like, in the same manner as the positive electrode.

It is common that the positive electrode and negative electrode are made by adhering an active-material layer, which is made by binding at least a positive-electrode active material or negative-electrode active material together with a binding agent, onto a current collector. Consequently, the positive electrode and negative electrode can be formed as follows: a composition for forming electrode mixture-material layer, which includes an active material and a binding agent as well as a conductive additive, if needed, is prepared; the resulting composition is applied onto the surface of a current collector after an appropriate solvent has been further added to the resultant composition to make it pasty, and is then dried thereon; and the composition is compressed in order to enhance the resulting electrode density, if needed.

For the current collector, it is possible to use meshes being made of metal, or metallic foils. As for a current collector, porous or nonporous electrically conductive substrates can be given, porous or nonporous electrically conductive substrates which comprise: metallic materials, such as stainless steels, titanium, nickel, aluminum and copper; or electrically conductive resins. As for a porous electrically conductive substrate, the following can be given: meshed bodies, netted bodies, punched sheets, lathed bodies, porous bodies, foamed bodies, bodies of fibrous assemblies like nonwoven fabrics, and the like, for instance. As for a nonporous electrically conductive substrate, the following can be given: foils, sheets, films, and so forth, for instance. As for an applying method of the composition for forming electrode mixture-material layer, it is allowable to use a method, such as doctor blade or bar coater, which has been heretofore known publicly.

As for a solvent for viscosity adjustment, the following are employable: N-methyl-2-pyrrolidone (or NMP), methanol, methyl isobutyl ketone (or MIBK), and the like.

As for an electrolyte, it is possible to use organic-solvent-system electrolytic solutions, in which an electrolyte has been dissolved in an organic solvent, or polymer electrolytes, in which an electrolytic solution has been retained in a polymer, and the like. Although the organic solvent, which is included in that electrolytic solution or polymer electrolyte, is not at all one which is limited especially, it is preferable that it can include a chain ester (or a linear ester) from the perspective of load characteristic. As for such a chain ester, the following organic solvents can be given: chain-like carbonates, which are represented by dimethyl carbonate, diethyl carbonate and ethyl methyl carbonate; ethyl acetate; and methyl propionate, for instance. It is also allowable to use one of these chain esters independently, or to mix two or more kinds of them to use. In particular, in order for the improvement in low-temperature characteristic, it is preferable that one of the aforementioned chain esters can account for 50% by volume or more in the entire organic solvent; especially, it is preferable that the one of the chain esters can account for 65% by volume or more in the entire organic solvent.

However, as for an organic solvent, rather than constituting it of one of the aforementioned chain esters alone, it is preferable to mix an ester whose permittivity is high (e.g., whose permittivity is 30 or more) with one of the aforementioned chain esters to use in order to intend the upgrade in discharged capacity. As for a specific example of such an ester, the following can be given: cyclic carbonates, which are represented by ethylene carbonate, propylene carbonate, butylene carbonate and vinylene carbonate; γ-butyrolactone; or ethylene glycol sulfite, and the like, for instance. In particular, cyclically-structured esters, such as ethylene carbonate and propylene carbonate, are preferable. It is preferable that such an ester whose permittivity is high can be included in an amount of 10% by volume or more in the entire organic solvent, especially 20% by volume or more therein, from the perspective of discharged capacity. Moreover, from the perspective of load characteristic, 40% by volume or less is more preferable, and 30% by volume or less is much more preferable.

As for an electrolyte to be dissolved in the organic solvent, one of the following can be used independently, or two or more kinds of them can be mixed to use: $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(CF_3SO_2)_2$, $LiC(CF_3SO_2)_3$, or $LiC_nF_{2n+1}SO_3$ (where "n"≥2), and the like, for instance. Among them, $LiPF_6$ or $LiC_4F_9SO_3$, and so forth, from which favorable charging/discharging characteristics are obtainable, can be used preferably.

Although a concentration of the electrolyte in the electrolytic solution is not at all one which is limited especially, it can preferably be from 0.3 to 1.7 mol/dm$^3$, especially from 0.4 to 1.5 mol/dm$^3$ approximately.

Moreover, in order to upgrade the safety or storage characteristic of battery, it is also allowable to make a non-aqueous electrolytic solution contain an aromatic compound. As for an aromatic compound, benzenes having an alkyl group, such as cyclohexylbenzene and t-butylbenzene, biphenyls, or fluorobenzene can be used preferably.

As for a separator, it is allowable to use those which have sufficient strength, and besides which can retain electrolytic solutions in a large amount. From such a viewpoint, it is possible to use the following, which have a thickness of from 5 to 50 μm, preferably: micro-porous films which are made of polypropylene, polyethylene or polyolefin, such as copolymers of propylene and ethylene; or nonwoven fabrics, and the like. In particular, in a case where such a thin separator as having from 5 to 20 μm in thickness is used, the characteristics of battery are likely to degrade during charging/discharging cycles or storage at high temperatures, and the safety declines as well. However, since a lithium-ion secondary battery, in which one of the above-mentioned composite oxides is used as the positive-electrode active material, is excellent in the stability and safety, it is possible to make the resulting batteries function stably even when such a thin separator is used.

A configuration of lithium-ion secondary batteries, which are constituted by means of the constituent elements as above, can be made into various sorts of those such as cylindrical types, laminated types and coin types. Even in a case where any one of the configurations is adopted, the separators are interposed between the positive electrodes and the negative electrodes to make electrode assemblies. And, these electrode assemblies are sealed hermetically in a battery case after connecting intervals from the positive-electrode current collectors and negative-electrode current collectors up to the positive-electrode terminals and negative-electrode terminals, which lead to the outside, with leads for collecting electricity, and the like, and then impregnating these electrode assemblies with the aforementioned electrolytic solution, and thereby a lithium-ion secondary battery completes.

In a case where lithium-ion secondary batteries are made use of, the positive-electrode active material is activated by carrying out charging in the first place. However, in a case where one of the above-mentioned composite oxides is used as a positive-electrode active material, lithium ions are released at the time of first-time charging, and simultaneously therewith oxygen generates. Consequently, it is desirable to carry out charging before sealing the battery case hermetically.

A lithium-ion secondary battery, in which one of the composite oxides being obtained by means of the production process according to the present invention as explained above is used, can be utilized suitably in the field of automobile in addition to the field of communication device or information-related device such as cellular phones and personal computers. For example, when vehicles have this lithium-ion secondary battery on-board, it is possible to employ the lithium-ion secondary battery as an electric power source for electric automobile.

So far, some of the embodiment modes of the production process for composite oxide, positive-electrode active material for lithium-ion secondary battery and lithium-ion secondary battery according to the present invention have been explained. However, the present invention is not one which is limited to the aforementioned embodiment modes. It is possible to execute the present invention in various modes, to which changes or modifications that one of ordinary skill in the art can carry out are made, within a range not departing from the gist.

EXAMPLES

Hereinafter, the present invention will be explained in detail while giving specific examples of the production process for composite oxide, positive-electrode active material for lithium-ion secondary battery and lithium-ion secondary battery according to the present invention.

Based on the aforementioned embodiment modes, composite oxides comprising dual crystalline structures of layered rock-salt structure and spinel structure were synthesized by the following procedures.

Example No. 1

Synthesis of $Li_2MnO_3$-Spinel Mixed-Phase Compound 0.10-mol (i.e., 4.2-gram) lithium hydroxide monohydrate, $LiOH.H_2O$, was mixed with 0.15-mol (i.e., 10.3-gram) lithium nitrate, $LiNO_3$, to prepare a molten-salt raw material. To this, 0.010-mol (i.e., 0.87-gram) manganese dioxide, $MnO_2$, was added as a metallic-compound raw material, thereby preparing a raw-material mixture. That is, the ratio, namely, (Transition Metal in Metallic-compound Raw Material)/(Lithium Metal in Molten-salt Raw Material), was 0.01 mol/0.25 mol=0.04.

The raw-material mixture was put in a crucible being made of mullite, and was then vacuum dried by a vacuum drier at 120° C. for 12 hours. Thereafter, the drier was returned back to the atmospheric pressure; the crucible, in which the raw-material mixture was held, was taken out and was then transferred immediately to an electric furnace, which had been heated to 350° C. Then, the electric furnace was raised to 400° C. in temperature, and so the crucible, in which the raw-material mixture was held, was heated at 400° C. for 1 hour in air. On this occasion, the raw-material mixture was melted to turn into molten salt, and thereby a black-colored product deposited.

Next, the crucible, in which the molten salt was held, was taken out from the electric furnace, and was then cooled at room temperature. After the molten salt was cooled fully to solidify, the solidified molten salt was dissolved in water by immersing the molten salt as being held in the crucible into 200-mL ion-exchanged water and then stirring them therein. Since the black-colored product was insoluble in water, the water turned into a black-colored suspension liquid. When filtering the black-colored suspension liquid, a transparent filtrate was obtained, and a black-colored, solid filtered substance was obtained on the filter paper. The obtained filtered substance was further filtered while washing it fully with use of ion-exchanged water. After vacuum drying the post-washing black-colored solid at 120° C. for 6 hours, it was pulverized using a mortar and pestle.

Figure 1:
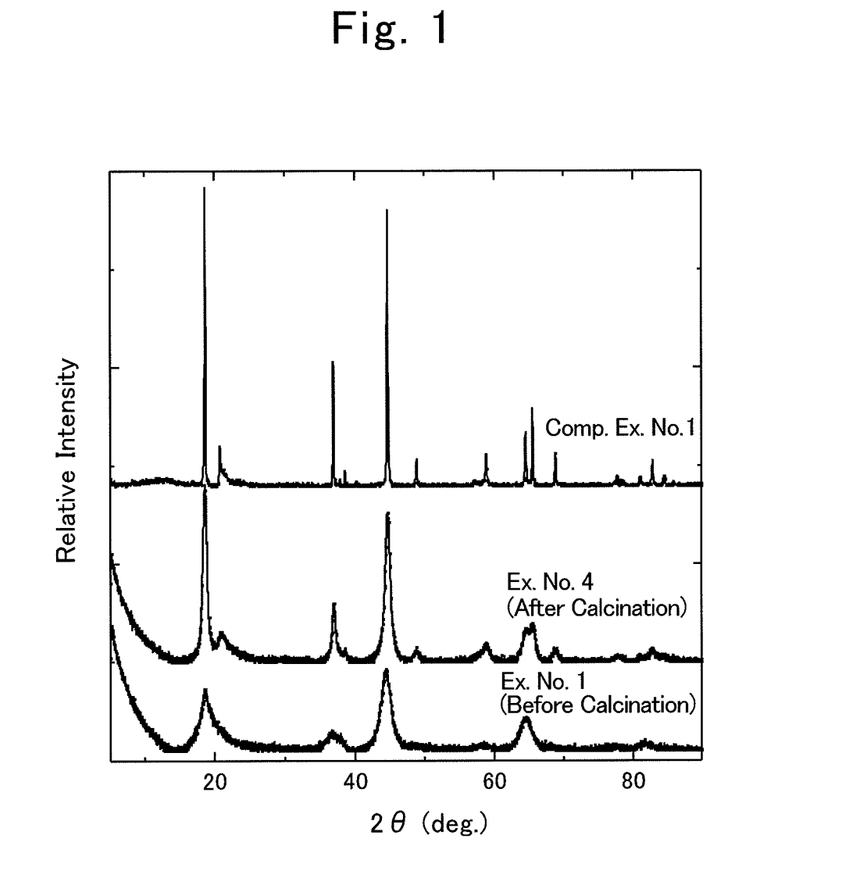
FIG. 1 illustrates results of an X-ray diffraction measurement on composite oxides that were produced by means of a production process for composite oxide according to the present invention, and that on a composite oxide that was produced by means of a conventional method.

An X-ray diffraction (or XRD) measurement, in which the $CuK\alpha$ ray was used, was carried out for the obtained black-colored powder. The measurement result is shown in FIG. 1. Since a spinel structure and a layered rock-salt structure have similar structures one another crystallographically, it is difficult to make a distinction between the two by means of the XRD diffraction patters alone in a case where the half-value widths are so broad like nano-sized particles that indefinite diffraction peaks are exhibited. However, from the XRD diffraction patters in FIG. 1, only peaks that are specific to spinel structure and layered rock-salt structure were observed, no mingling or the like of the other phases was seen. Moreover, it was ascertained that a composition, which was obtained from an emission spectroscopic (e.g., ICP) analysis and an average valency analysis of Mn by means of oxidation-reduction titration, was $Li_{1.2}MnO_{2.45}$, and that the average valency of Mn was 3.7. That is, it was understood that the obtained compound had a mixed phase between $Li_2MnO_3$ with an $\alpha$-$NaFeO_2$ type layered rock-salt structure and compound possessing a spinel structure.

Moreover, since the obtained product was $Li_{1.2}MnO_{2.45}$, the other ratio, namely, (Li in Targeted Product)/(Li in Molten-salt Raw Material), was 0.012 mol/0.25 mol=0.048, assuming that all of Mn in the manganese dioxide was supplied to $Li_{1.2}MnO_{2.45}$.

Note that the evaluation on the valency of Mn was carried out as follows. A sample was taken in an amount of 0.05 g in an Erlenmeyer flask; a 1% sodium oxalate solution was added thereto in an amount of 40 mL accurately; $H_2SO_4$ was further added thereto in an amount of 50 mL; and then the sample was dissolved within a 90° C. water bath in a nitrogen-gas atmosphere. To the resulting mixture solution, 0.1N potassium permanganate was dropped to titrate it, and the titration was carried out until an end point at which the mixture solution changed the color to a faint rouge-like color (i.e., a titer, "V1"). Meanwhile, another 1% sodium oxalate solution was taken in an amount of 20 mL accurately in another flask, and another 0.1N potassium permanganate was dropped to titrate the resultant mixture solution in the same manner as aforementioned until the end point (i.e., another titer, "V2"). According to the following equation, an amount of oxalic acid, which was consumed when Mn with higher number of valence was reduced to $Mn^{2+}$, was calculated as an oxygen amount (or active-oxygen amount) from the "V1" and "V2".

(Active-oxygen Amount) (%)=[{(2× "V2"− "V1")× 0.00080}/(Amount of Sample)]×100

And, an averaged valency of Mn was calculated from an Mn amount in the sample (e.g., a measured value by ICP analysis) and the resulting active-oxygen amount.

Example No. 2

Synthesis of Al-substituted $Li_2MnO_3$-Spinel Mixed-Phase Compound 0.10-mol (i.e., 4.2-gram) lithium hydroxide monohydrate, $LiOH.H_2O$, was mixed with 0.20-mol (i.e., 13.8-gram)

lithium nitrate, LiNO$_3$, to prepare a molten-salt raw material. To this, a precursor was added as a metallic-compound raw material in an amount of 1.0 g to prepare a raw-material mixture. Hereinafter, a synthesis procedure for the precursor will be explained.

0.95-mol (i.e., 272.7-gram) Mn(NO$_2$)$_2$.6H$_2$O, and 0.05-mol (i.e., 18.8-gram) Al(NO$_3$)$_3$.9H$_2$O were dissolved in 500-mL distilled water to make a metallic-salt-containing aqueous solution. While this aqueous solution was stirred within an ice bath using a stirrer, one in which 50-gram (i.e., 1.2-mol) LiOH.H$_2$O had been dissolved in 300-mL distilled water was dropped to the aqueous solution over a time period of 2 hours to alkalify it, thereby precipitating deposits of metallic hydroxides. While keeping this solution holding the deposit therein at 5° C., aging was carried out for one day in an oxygen atmosphere. A precursor with Mn:Al=0.95:0.05 was obtained by means of calcining the obtained deposits at 300° C. for 1 hour in air after filtering them, washing them with use of distilled water and then drying them.

Note that it was ascertained by means of the X-ray diffraction measurement that the obtained precursor comprised a mixed phase between Mn$_3$O$_4$ and Al$_2$O$_3$. Consequently, a content of metallic elements was 0.0133 mol in 1 gram of this precursor. That is, the ratio, namely, (Metal in Metallic-compound Raw Material)/(Lithium Metal in Molten-salt Raw Material), was 0.0133 mol/0.3 mol=0.044.

The raw-material mixture was put in a crucible being made of mullite, and was then vacuum dried at 120° C. for 24 hours within a vacuum drier. Thereafter, the drier was returned back to the atmospheric pressure; the crucible, in which the raw-material mixture was held, was taken out and was then transferred immediately to an electric furnace, which had been heated to 350° C., and was further heated at 350° C. for 2 hours in an oxygen atmosphere. On this occasion, the raw-material mixture was melted to turn into molten salt, and thereby a black-colored product deposited.

Next, the crucible, in which the molten salt was held, was taken out from the electric furnace, and was then cooled at room temperature. After the molten salt was cooled fully to solidify, the solidified molten salt was dissolved in water by immersing the molten salt as being held in the crucible into 200-mL ion-exchanged water and then stirring them therein. Since the black-colored product was insoluble in water, the water turned into a black-colored suspension liquid. When filtering the black-colored suspension liquid, a transparent filtrate was obtained, and a black-colored, solid filtered substance was obtained on the filter paper. The obtained filtered substance was further filtered while washing it fully with use of ion-exchanged water. After vacuum drying the post-washing black-colored solid at 120° C., for 6 hours, it was pulverized using a mortar and pestle.

When the XRD measurement was carried out in the same manner as Example No. 1, it was understood that the obtained compound had a mixed phase between compound possessing Li$_2$MnO$_3$ with an α-NaFeO$_2$ type layered rock-salt structure as the essential composition and another compound possessing a spinel structure. Moreover, according to the ICP analysis and the average valency analysis of Mn, it was ascertained that the valency of Mn was 3.8, and that the composition was Li$_{1.15}$Mn$_{0.95}$O$_{2.55}$.

Moreover, since the obtained product was Li$_{1.15}$Mn$_{0.95}$Al$_{0.05}$O$_{2.55}$, the other ratio, namely, (Li in Targeted Product)/(Li in Molten-salt Raw Material), was 0.0153 mol/0.3 mol=0.051, assuming that all of Mn in the precursor was supplied to Li$_{1.15}$Mn$_{0.95}$Al$_{0.05}$O$_{2.55}$.

Example No. 3

Synthesis of 0.5(Li$_2$MnO$_3$).0.5(LiNi$_{0.5}$Mn$_{1.5}$O$_4$)

0.10-mol (i.e., 4.2-gram) lithium hydroxide monohydrate, LiOH.H$_2$O, was mixed with 0.30-mol (i.e., 20.7-gram) lithium nitrate, LiNO$_3$, to prepare a molten-salt raw material. To this, a precursor was added as a metallic-compound raw material in an amount of 1.0 g to prepare a raw-material mixture. Hereinafter, a synthesis procedure for the precursor will be explained.

0.875-mol (i.e., 251.17-gram) Mn(NO$_3$)$_2$.6H$_2$O, and 0.125-mol (i.e., 36.35-gram) Ni(NO$_3$)$_2$.6H$_2$O were dissolved in 500-mL distilled water to make a metallic-salt-containing aqueous solution. While this aqueous solution was stirred within an ice bath using a stirrer, one in which 50-gram (i.e., 1.2-mol) LiOH.H$_2$O had been dissolved in 300-mL distilled water was dropped to the aqueous solution over a time period of 2 hours to alkalify it, thereby precipitating deposits of metallic hydroxides. While keeping this solution holding deposits therein at 5° C., aging was carried out for one day in an oxygen atmosphere. A precursor with Mn:Ni=0.875:0.125 was obtained by means of calcining the obtained deposits at 300° C. for 1 hour in air after filtering them, washing them with use of distilled water and then drying them.

Note that it was ascertained by means of the X-ray diffraction measurement that the obtained precursor comprised a mixed phase between Mn$_3$O$_4$ and NiO. Consequently, a content of transition metal elements was 0.0131 mol in gram of this precursor. That is, the ratio, namely, (Transition Metal in Metallic-compound Raw Material)/(Lithium Metal in Molten-salt Raw Material), was 0.0131 mol/0.4 mol=0.033.

The raw-material mixture was put in a crucible being made of mullite, and was then vacuum dried at 120° C. for 12 hours within a vacuum drier. Thereafter, the drier was returned back to the atmospheric pressure; the crucible, in which the raw-material mixture was held, was taken out and was then transferred immediately to an electric furnace, which had been heated to 400° C., and was further heated at 400° C. for 4 hours in an oxygen atmosphere. On this occasion, the raw-material mixture was melted to turn into molten salt, and thereby a black-colored product deposited.

Next, the crucible, in which the molten salt was held, was taken out from the electric furnace, and was then cooled at room temperature. After the molten salt was cooled fully to solidify, the solidified molten salt was dissolved in water by immersing the molten salt as being held in the crucible into 200-mL ion-exchanged water and then stirring them therein. Since the black-colored product was insoluble in water, the water turned into a black-colored suspension liquid. When filtering the black-colored suspension liquid, a transparent filtrate was obtained, and a black-colored, solid filtered substance was obtained on the filter paper. The obtained filtered substance was further filtered while washing it fully with use of ion-exchanged water. After vacuum drying the post-washing black-colored solids at 120° C. for 6 hours, it was pulverized using a mortar and pestle.

When the XRD measurement was carried out in the same manner as Example No. 1, it was understood that the obtained compound had a mixed phase between compound possessing Li$_2$MnO$_3$ with an α-NaFeO$_2$ type layered rock-salt structure as the essential composition and another compound possessing a spinel structure. Moreover, according to the ICP analysis and the average valency analysis of Mn, it was ascertained that the composition was 0.5(Li$_2$MnO$_3$).0.5 (LiNi$_{0.5}$Mn$_{1.5}$O$_4$), and that the average valency of Mn was 4.0.

Moreover, since the obtained product was $0.5(Li_2MnO_3) \cdot 0.5(LiNi_{0.5}Mn_{1.5}O_4)$, the other ratio, namely, (Li in Targeted Product)/(Li in Molten-salt Raw Material), was 0.00983 mol/0.4 mol=0.025, assuming that all of Ni in the precursor was supplied to $0.5(Li_2MnO_3) \cdot 0.5(LiNi_{0.5}Mn_{1.5}O_4)$.

Example No. 4

Synthesis of $Li_2MnO_3$—$Li_4Mn_5O_{12}$ $Li_2MnO_3$-spinel mixed-phase Compound, which had been obtained in Example No. 1, was further calcined by an electric furnace at 400° C. for 1 hour in air. The XRD measurement was carried out for the resulting post-calcination compound. The measurement result is shown in FIG. 1. According to the ICP analysis and the average valency analysis of Mn, it was $0.5(Li_2MnO_3) \cdot 0.5(Li_4Mn_5O_{12})$ because it was ascertained that the obtained composition was $Li_{1.2}MnO_{2.6}$ and the average valency of Mn was 4.0.

Comparative Example No. 1

Synthesis of $Li_2MnO_3$ 0.10-mol (i.e., 4.2-gram) lithium hydroxide monohydrate, $LiOH \cdot H_2O$, was mixed with 0.025-mol (i.e., 2.18-gram) manganese dioxide, $MnO_2$, with use of a mortar, thereby preparing a raw-material mixture.

The raw-material mixture was put in an alumina crucible, and then tentative calcination was carried out at 500° C. for 5 hours. The resulting post-tentative-calcination powder was calcined finally at 800° C. for 10 hours after pulverizing it with use of another mortar.

The X-ray diffraction measurement was carried out for the resulting post-final-calcination powder. The measurement result is shown in FIG. 1. According to the ICP analysis and the average valency analysis of Mn, it was understood that the obtained lithium manganate was $Li_2MnO_3$ that had a layered rock-salt structure.

Evaluations on Composite Oxides

XRD Measurement

As illustrated in FIG. 1, whether or not the calcination was done, the composite oxides according to Example No. 1 and Example No. 4 exhibited broader peaks than were those in the XRD pattern that was obtained from the composite oxide according to Comparative Example No. 1. That is, it is speculated that the composite oxides being obtained by means of the production processes according to Example Nos. 1 and 4 comprise fine particles. For example, c-axis-direction particle diameters, which were calculated from the (001) peak in each of $Li_2MnO_3$ at around 18.5 degrees in the XRD patterns that were obtained from the composite oxides according to Example Nos. 1 through 4, were from 4 to 15 nm, as given in Table 1.

Observation of Primary Particles

Regarding the composite oxides according to the respective examples and the comparative example, their primary particles were observed using a transmission electron microscope (or TEM) for the composite oxides according to the examples, whereas using a scanning electron microscope (or SEM) for the composite oxide according to the comparative example. From the resulting TEM images and SEM image, particle diameters of the primary particles were measured. In measuring the particle diameters, a maximum length in a case where one of the particles was held between two parallel lines was measured, and it was measured for the particles in a quantity of 25 pieces to obtain the number average value. The measurement results are given in Table 1. Moreover, c-axis-direction crystallite particle diameters, which were calculated from the (001) peak in each of $Li_2MnO_3$ at around 18.5 degrees in the XRD patterns, are also given in Table 1. Note that no such a calculation was done for the composite oxide according to the comparative example because it was believed that its half-value width of the (001) peak were small and its crystallite size was 100 nm or more.

TABLE 1

|  | Particle Dia. (nm) Measured from TEM Image (or SEM Image) | c-axis-direction Particle Dia. (nm) Found from Half-value Width |
|---|---|---|
| Ex. No. 1 | 50 | 12 |
| Ex. No. 2 | 42 | 12 |
| Ex. No. 3 | 30 | 4 |
| Ex. No. 4 | 60 | 15 |
| Comp. Ex. No. 1 | 20000 | — |

The composite oxides according to Example Nos. 1 through 4 were fine particles whose particle diameters were 100 nm or less. When observing the composite oxides, which had been obtained in Example Nos. 1 through 4, by means of TEM, any of the particles were a single crystal, respectively, although not shown in the drawing. Consequently, the particle diameters being calculated from the half-value widths became values that were on the same order as those of the primary-particle diameters that were measured from the TEM images. On the other hand, in the composite oxide according to Comparative Example No. 1, the primary particles were a polycrystalline body, and were very large particles whose particle diameters were 2 μm or more.

Lithium-Ion Secondary Battery $Li_2MnO_3$-spinel mixed-phase compounds, the composite oxides according Example No. 1 and Example No. 4, were used as a positive-electrode active material, respectively, thereby making two types of lithium-ion secondary batteries.

The following were mixed one another: any one of the above-mentioned positive-electrode active materials (i.e., composite oxides) in an amount of 90 parts by mass; 5-part-by-mass carbon black (or KB) serving as a conductive additive; and 5-part-by-mass polyvinylidene fluoride serving as a binding agent (or binder), and then they were dispersed in N-methyl-2-pyrolidone serving as a solvent, thereby preparing a slurry. Subsequently, this slurry was coated onto an aluminum foil, namely, a current collector, and was then dried thereon. Thereafter, the slurry was press rolled to 60 μm in thickness, and then the coated aluminum foil was punched out to a size of φ11 mm in diameter, thereby obtaining a positive electrode. Moreover, metallic lithium with φ14 mm and 200 μm in thickness was made into a negative electrode to be faced to the positive electrode.

Microporous polyethylene films with 20 μm in thickness serving as separators were held between the positive electrodes and the negative electrodes to make them into an electrode-assembly battery. This electrode-assembly battery was accommodated in a battery case (e.g., CR2032, a coin cell produced by HOHSEN Co., Ltd.). Moreover, a non-aqueous electrolyte, in which $LiPF_6$ was dissolved in a concentration of 1.0 mol/L into a mixed solvent in which ethylene carbonate and diethyl carbonate were mixed in a volumetric ratio of 3:7, was injected into the battery case, thereby obtaining a lithium-ion secondary battery.

Charging/Discharging Test

Figure 2:
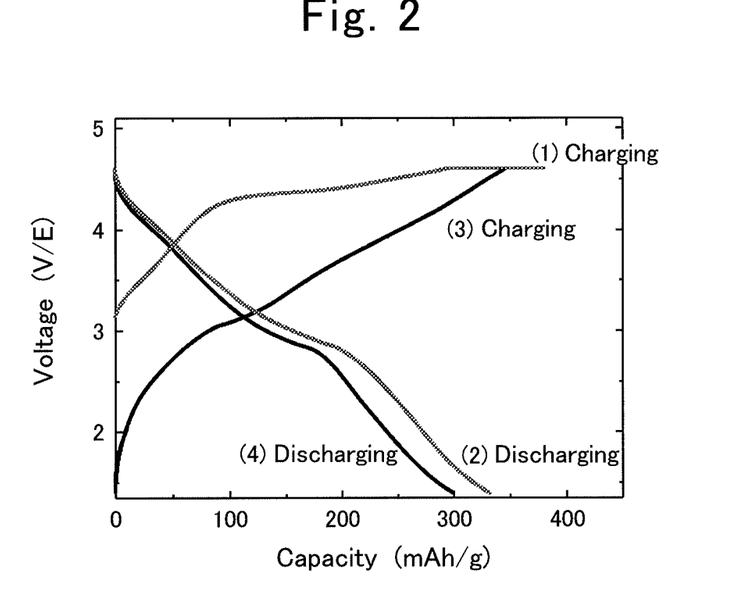
FIG. 2 is a graph for illustrating charging/discharging characteristics of a lithium-ion secondary battery in which a composite oxide being produced by means of a production process (i.e., Example No. 1) for composite oxide according to the present invention was used as the positive-electrode active material.
Figure 3:
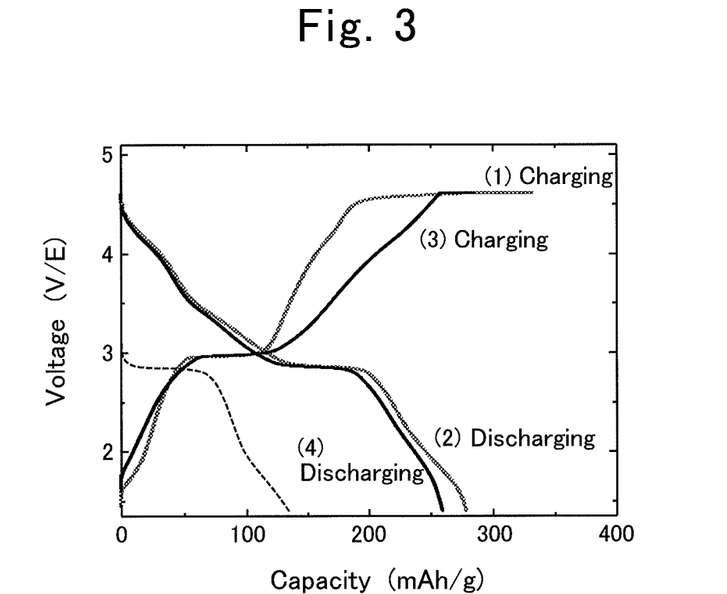
FIG. 3 is a graph for illustrating charging/discharging characteristics of a lithium-ion secondary battery in which another composite oxide being produced by means of a production process (i.e., Example No. 4) for composite oxide according to the present invention was used as the positive-electrode active material.

Regarding each of the above-mentioned lithium-ion secondary batteries, a charging/discharging test was carried out at room temperature. In the charging/discharging test, after a CCCV charging (i.e., constant-current and constant-voltage charging) operation was carried out at 0.2 C up to 4.6 V to activate the positive-electrode active material, a CC discharging operation was carried out at 0.2 C down to 1.4 V. After the second cycle and later on, the following charging and discharging operations were carried out repeatedly: a CCCV charging (i.e., constant-current and constant-voltage charging) operation was carried out at 0.2 C up to 4.6 V; and a CC discharging operation was carried out at 0.2 C down to 1.4 V. Note that a condition for terminating the constant-voltage charging operation was set at an electric-current value of 0.02 C. Results when the charging/discharging test was carried out up to the second cycle are illustrated in FIG. 2 and FIG. 3, respectively. Note that, in these diagrams, the charging and discharging operations at the first cycle are labeled (1) and (2), respectively; whereas the charging and discharging operations at the second cycle are labeled (3) and (4), respectively. Note that, in the graph of FIG. 3, the dotted line represents the initial discharging operation that had been carried out prior to the charging operation labeled (1).

In the lithium-ion secondary battery in which only $Li_2MnO_3$ that did not include any spinel structure was used as the positive-electrode active material, an irreversible capacity, namely, the difference between the capacity at the charging operation in the first cycle and the other capacity at the discharging operation in the first cycle became 100 mAh/g approximately, although not shown in the drawings. However, as can be understood from FIG. 2 and FIG. 3, in the lithium-ion secondary batteries in which the composite oxides according to Example No. 1 and Example No. 4 were employed respectively as the positive-electrode active material, the irreversible capacities were reduced to 50 mAh/g or less. Moreover, the lithium-ion secondary battery in which the composite oxide according to Example No. 4 was employed as the positive-electrode active material had been capable of discharging at 3 V or less since it was in the state before being charged (see the dotted line in FIG. 3). This is presumed to be due to the fact that Li had been inserted into parts that had a spinel structure.

The invention claimed is:

1. A production process for composite oxide being characterized in that:
it is a production process for composite oxide comprising a dual crystal structure of layered rock-salt structure and spinel structure, and the composite oxide at least including lithium (Li) element and manganese (Mn) element;
said composite oxide is obtained via the following:
a raw-material mixture preparation step of preparing a raw-material mixture by mixing a metallic-compound raw material and a molten-salt raw material with each other,
the metallic-compound raw material at least including one or more kinds of Mn-containing metallic compounds being selected from the group consisting of oxides, hydroxides and metallic salts that include one or more kinds of metallic elements in which Mn is essential,
the molten-salt raw material including lithium hydroxide and lithium nitrate, and exhibiting a proportion of the lithium hydroxide with respect to the lithium nitrate (i.e., (Lithium Hydroxide)/(Lithium Nitrate)) that falls in a range of from 0.05 or more to less than 1 by molar ratio;
a molten reaction step of reacting said raw-material mixture at from 300° C. or more to 550° C. or less by melting it: and
a recovery step of recovering said composite oxide being generated from said raw-material mixture that has undergone the reaction.

2. The production process for composite oxide as set forth in claim 1 further including a heat-calcination treatment step, in which said composite oxide being recovered is heated, after said recovery step.

3. The production process for composite oxide as set forth in claim 2, wherein said heat-calcination treatment step is a step of heating said composite oxide in an oxygen-containing atmosphere.

4. The production process for composite oxide as set forth in claim 1, wherein said metallic-compound raw material further includes one or more kinds of second metallic compounds being selected from the group consisting of oxides, hydroxides and metallic salts that include one or more kinds of metallic elements other than Mn.

5. The production process for composite oxide as set forth in claim 4, wherein said second metallic compounds include one or more kinds of transition metal elements other than Mn.

6. The production process for composite oxide, wherein a precursor synthesis step, in which an aqueous solution including at least two kinds of metallic elements is alkalified in order to obtain precipitates, is further carried out before the raw-material mixture preparation step in the production process for composite oxide as set forth in claim 1, and then said metallic-compound raw material including the precipitates is employed at the mixture preparation step.

7. The production process for composite oxide as set forth in claim 1, wherein said molten-salt raw material exhibits a proportion of lithium hydroxide with respect to lithium nitrate (i.e., (Lithium Hydroxide)/(Lithium Nitrate)), the proportion falling in a range of from 0.2 or more to 0.7 or less by molar ratio.

8. The production process for composite oxide as set forth in claim 1, wherein said raw-material mixture exhibits a proportion of metal being included in said metallic-compound raw material with respect to lithium metal being included in said molten-salt raw material (i.e., (Metal in Metallic-compound Raw Material)/(Lithium Metal in Molten-salt Raw Material)), the proportion falling in a range of from 0.01 or more to 0.2 or less by molar ratio.

9. The production process for composite oxide as set forth in claim 1, wherein said molten reaction step is carried out in an oxygen-containing atmosphere.

10. The production process for composite oxide as set forth in claim 1, wherein said molten-salt raw material does not include any lithium peroxide.

11. The production process for composite oxide as set forth in claim 1, wherein the molten reaction step of reacting said raw-material mixture is conducted at from 330° C. or more to 550° C. or less.

* * * * *